United States Patent Office 3,557,023
Patented Jan. 19, 1971

3,557,023
PROCESS OF PREPARING AN ADSORBENT FOR TREATING BEVERAGES FROM ACID-ACTIVATED MONTMORIN MINERALS
Karl J. Raible, Grafelfing, via Munich, Germany, assignor to Aktiengesellschaft für Brauerei-Industrie, Basel, Switzerland
No Drawing. Filed July 2, 1968, Ser. No. 741,895
Claims priority, application Germany, July 4, 1967,
A 56,178
Int. Cl. B01j *11/62*
U.S. Cl. 252—450   6 Claims

ABSTRACT OF THE DISCLOSURE

The mineral which has been activated by an acid treatment and has been separated from the activating acid is subjected to a chemical aftertreatment which reduces the amount of residual iron and/or aluminum which can be transferred from said montmorin mineral to slightly acid liquids contacting the same.

---

It is known that fermented beverages such as wine and beer which have been bottled and stored for some time contain precipitated proteins. To avoid the formation of such precipitates, it has been customary for some time to treat such beverages with adsorbents in order to remove the proteins which would subsequently be precipitated.

Silicates having an expanding lattice structure have been suggested as adsorbents for this purpose. A considerable practical importance has been gained by minerals of the montmorin group, above all, montmorillonite, beidellite and nontronite clays (also known as bentonites) as well as hectorite clays.

Bentonites occur naturally in two modifications, which are described as sodium bentonite and calcium bentonite. Both modifications have been used to treat beverages. Of these modifications, sodium bentonite is more effective. On the other hand, sodium bentonite cannot easily be introduced into the beverage to be treated because it swells rapidly and causes a formation of lumps. Even when these difficulties are overcome by proper technology, sodium bentonite still has the disadvantage that it assumes a state of extremely fine division by swelling in the beverage to be treated and cannot be removed by filtration. A period of several days must be allowed for to permit a settling of the protein-laden sodium bentonite out of the beverage. It is virtually impossible to recover the beverage which is contained in the sediment, which has a substantial volume.

The disadvantages described above are less pronounced with calcium bentonite, which does not swell to the same extent as sodium bentonite. For this reason, it may be possible to remove calcium bentonite from the beverage with filtering aids, such as diatomaceous earth. Alternatively, the precipitates can be separated more rapidly by natural settling. The calcium bentonite sludge which contains lost beverage is more compact. On the other hand, the material as such is much less effective. A common disadvantage of both sodium and calcium bentonites resides in the fact that both materials may contain mineral impurities, which may have quite undesirable effects on the quality of the treated beverage.

The modified material obtained by an acid treatment of montmorin minerals would be most desirable. Such products are known as bleaching clay or Fullers' earth. Bleaching clay can be made in that crude clay is pre-swelled with water and is then activated by boiling with mineral acid. The activating acid is subsequently removed and the activated clay is carefully washed with water. This is followed by drying and milling.

Such bleaching clays are inexpensive. They will not swell when suspended in water and for this reason can easily be removed from a beverage by filtration. Such acid-activated bleaching clay may even be used as filtering aids instead of diatomaceous earth or powdered cellulose.

The German patent specification No. 682,788 describes the use of acid-activated bentonites (bleaching clay). This process has not become accepted, however, because the acid-activated bleaching clays, which do not swell, do not have an adequate protein-adsorbing activity. In the German patent specification No. 874,742, reference is made to the relation of the adsorbent activity and the swelling capacity of the bentonites used in the treatment of beverages. It is recommended in the last-mentioned patent specification, that bentonites which do not expand or expand only to a small extent should be treated with alkali salts to produce expanding bentonites. On the other hand, acid-activated bleaching clays may be used in treating beverages, particularly beer, in a mixture with finely ground silica gel, as is described, e.g., in the Austrian patent specification No. 249,611.

It is an object of the invention to produce a beverage-clarifying agent from acid-activated minerals of the montmorin group. It has surprisingly been found that acid-treated minerals of the montmorin group, such as bleaching clays, made of calcium bentonite are free of water-soluble substances but under the action of a slightly acid medium, such as wine and beer, transfer substantial amounts of iron and aluminum into the beverage. This may be the reason for the lack of success of acid-activated bleaching clays in the protein control of wine and beer.

As to beer, all textbooks describe the deleterious influence of iron on the quality of the beer. Iron promotes oxidation processes, which have an adverse effect on the colloidal stability and on the stability of taste, It is also known that aluminum salts have a stronger tendency to precipitate proteins than other salts because aluminum is trivalent.

When a sample of good bleaching clay is suspended in distilled water, no more than 0.1–0.2% of the clay will be dissolved. It is also found that virtually no iron and no aluminum will be dissolved. On the other hand, if the same bleaching clay is stirred into a buffer solution which has the same pH-value as beer, about 4.5, it will be found that iron (Fe) alone can be dissolved in an amount of up to 0.2%.

When this observation is applied to a practical treatment of beer with such bleaching clay, the use of 100 grams bleaching clay per hectoliter of beer will increase the iron content of the beer by as much as 2 milligrams per liter, whereas an iron content of 0.4–0.5 milligram per liter is considered an upper limit in beer.

Analogous results will be obtained in the treatment of wine, in which additional iron is also undesirable.

A similar situation will be obtained as far as aluminum is concerned. Whereas high-grade bleaching clay products transfer virtually no aluminum into water, it is found that slightly acid solutions, such as wine or beer, can dissolve considerable amounts of aluminum out of the bleaching clay. For instance, a small-scale experiment using buffer solutions or 0.5% maleic acid having a pH-value in the same range as wine and beer will show that as much as 0.3% aluminum can enter into solution.

It has been found that the transfer of iron and aluminum from acid-activated montmorillonite minerals (bleaching clays) into slightly acid liquids can be very considerably reduced if these minerals which have been activated with acid and separated from the activating acid are first washed with dilute acids, preferably dilute mineral acids, before the further washing of said products with water. Depending on the nature of the raw materials, this procedure may reduce to as much as one fourth the amount of iron and/or aluminum which will be transferred into slightly acid liquids.

Another measure to reduce the transfer of iron and aluminum to slightly acid liquids resides in that the acid-activated bleaching clay from which the activating acid has been removed is subjected before its further washing with water to a treatment with solutions of chemicals which either block the iron and aluminum in the clay so that they are no longer soluble in slightly acid liquids or which dissolve to a larger or smaller extent the iron and aluminum which are contained in the activated clay and are still soluble in slightly acid liquids so that the iron and aluminum can be washed out from the clay by the subsequent washing with water.

This treatment may be carried out with neutral or acid solutions of polymeric phosphates or polyphosphoric acids in water as well as solutions of oxalic acid or salts thereof, aqueous solutions of citric acid or its salts, aqueous solutions of fluosilicic acid or its salts and finally dilute solutions of sodium silicate (water-glass). The mechanism of the actions of the various chemicals which are employed is not fully understood.

Best results will be obtained if a plurality of the foregoing measures are combined. In a preferred procedure, fluosilicic acid, e.g., is added to the acid-activated montmorin minerals at the end of the activating treatment. The mixture is then pumped into a filter press. When the surplus activating acid has drained off, the filter cake is washed with dilute mineral acid. Still in the filter press, the filter cake is subsequently washed with an aqueous solution of one or more of the above-mentioned chemicals. The clay is finally washed with water until all water-soluble substances have been removed.

The acid-activated montmorin minerals which have been treated as described above to reduce the amount of iron and aluminum they can transfer into slightly acid liquids can be used to treat beverages without the above-described disadvantages.

Surprisingly it has also been found that acid-activated clay minerals of the montmorin group in which the residual iron and aluminum have been blocked as described above exert also a better protein stabilization effect than comparison products from which iron and aluminum have not been eliminated. Said activity is so good that the products can compete with silica gel compounds in the treatment of beer and are not inferior to sodium bentonite in this respect whereas they additionally afford the advantages first described, namely, the improved handling because there is no swelling.

After the usual washing with water, bleaching clay products which have been treated as described can either be merely strongly pressed or can be partly or completely dried and subsequently ground. For clarifying beverages, the powdered product is stirred in a small amount of water; this suspension is added to the beverage to be treated.

Grinding may be omitted and the partly or completely dried material may be sold as granules. This may have the advantage that a strong formation of dust is avoided when the adsorbent is weighed in the brewery or wine press. The granules may then be pasted with a bit of liquid and may be very finely comminuted with the aid of a high-speed dispersing apparatus. This comminution results in particularly fine suspensions, which have a higher adsorption capacity than a comparison product which has been dried and subsequently dry-ground in usual mills. The processing of dry granular bleaching clay to very fine suspensions by a wet grinding with the aid of a dispersing apparatus will be facilitated if the product has previously been carefully dried because a slow drying at a low temperature (up to 150° C.) will result in much softer granules than a very fast drying at very high temperatures.

The adsorbent according to the invention may be combined with other adsorbents or stabilizing processes. It may be used at the end of the production process before the filtration and bottling or—as required—in intermediate stages of the production process.

EXAMPLE 1

Production of an acid-activated bleaching clay which transfers only little iron and aluminum to slightly acid liquids.

2800 grams calcium bentonite from the deposits near Moodsburg, Bavaria, are comminuted and preswelled with 10 liters water over night. 2.8 liters concentrated hydrochloric acid (36%) are then added. The mixture is boiled for six hours. Samples containing 80 grams clay on a dry basis are taken from this mixture.

Sample A is charged to a suction filter. The activating acid is sucked off. For washing the filter cake, 1500 milliliters tap water are pumped through the filter cake to wash it.

Sample B is charged to a suction filter. When the activating acid has drained off, the filter cake is washed with a solution of 10 milliliters concentrated hydrochloric acid in 300 milliliters tap water. 1200 milliliters tap water are then sucked through the filter cake to wash it.

Sample C is charged to a suction filter and the activating acid is sucked off. A solution of 10 milliliters concentrated hydrochloric acid and 3.2 grams sodium metaphosphate in 300 milliliters tap water are then sucked through the filter cake. The filter cake is subsequently washed with 1200 milliliters tap water.

Sample D.—When the activating acid has drained off, the filter cake is washed with a solution of 10 milliliters concentrated hydrochloric acid in 300 milliliters tap water. A solution of 3.2 grams sodium metaphosphate in 300 milliliters tap water is then sucked through the filter cake. The filter cake is finally washed with 900 milliliters tap water.

The four filter cakes A–D are dried at 120° C. and subsequently comminuted.

40 grams of the dried bleaching clay are suspended in 200 milliliters of a citrate-hydrochloric acid buffer solution according to Sorsensen, having a pH-value of 4.0, and are stored over night. The suspension is centrifuged. The dissolved amounts of iron and aluminum are determined. Based on 100 grams bleaching clay substance, the following amounts of soluble iron and aluminum are found (in milligrams):

|  | Iron | Aluminum |
|---|---|---|
| Sample A | 263 | 175 |
| Sample B | 86 | 78 |
| Sample C | 60 | 65 |
| Sample D | 35 | Traces |

EXAMPLE 2

Preparation of an acid-activated bleaching clay which transfers only little iron and aluminum to slightly acid liquids 280 grams calcium bentonite from the deposits near Moosburg, Bavaria, are comminuted and preswelled with 1 liter water over night. 280 milliliters concentrated hydrochloric acid are then added. The mixture is boiled for six hours and is then divided into two equal parts:

(A) Part A is charged to a suction filter, where the activating acid is sucked off. The residue is then washed on the suction filter with tap water in a total amount of 2 liters.

(B) The other half is charged to the suction filter and the activating acid is sucked off. A solution of 2 grams sodium metaphosphate and 10 milliliters concentrated hydrochloric acid in 200 milliliters water is then sucked through the filter cake.

The latter is subsequently washed with 1800 milliliters tap water.

Both filter cakes are dried at 150° C. over night and subsequently ground. The yield is about 100 grams in each case. Based on this yield, the amount of sodium metaphosphate used in Part B was about 2% of the dry weight of the treated clay.

Determination of soluble iron and soluble aluminum 1.5 grams of the dried and ground products are suspended in 15 milliliters citric acid-phosphate buffer solution, pH 4.5, according to McIlvaine, and are stored for one day with shaking from time to time. The suspension is then centrifuged. The dissolved iron is determined by colorimetry.

Result (A) Blank sample without phosphate treatment: 2.0 milligrams Fe per gram of dry weight=0.2%.

(B) Phosphate-treated sample: 0.8 milligram Fe per gram of dry weight=0.08%.

In an analogous test, 15 grams of the two samples are suspended in 150 milliliters of 0.5% maleic acid solution and stored for one day. The iron and aluminum which have been dissolved in said suspension medium are determined.

Result (A) Blank sample without phosphate treatment: 0.56 milligram Fe and 2.3 milligrams Al per gram of dry matter.

(B) Phosphate-treated sample: 0.17 milligram Fe and 1.2 milligrams Al per gram of dry matter.

EXAMPLE 3

Aftertreatment of acid-activated montmorillonite clay with aqueous solutions of various chemicals A series of mixtures are prepared as follows:

200 grams calcium bentonite from the deposits near Moosburg, Bavaria, are dried and finely ground and then preswelled in 1 liter water over night. 200 milliliters concentrated hydrochloric acid are added and the mixture is boiled for six hours. The mixtures are then charged to a suction filter, where they are washed with 1000 milliliters distilled water to remove the activating acid. The matter on the suction filter is subsequently treated with the solutions of the chemicals which are mentioned below. These chemicals are dissolved in 500 milliliters distilled water. The resulting solutions are sucked through the filter cakes within about two hours. The effluent from the suction filter is collected, also the distilled water which has been used for the subsequent washing in an amount of 1 liter per filter cake. The aftertreatment effluent together with the used washing water are then subjected to wet incineration. Thereafter, the dissolved iron and aluminum are determined. The values are indicated in Table 1 as milligrams of dissolved iron and aluminum per 100 grams of crude clay.

The filter cakes are subsequently dried and finely ground. An amount corresponding to 100 grams of starting clay is then suspended in 500 milliliters citric acid-phosphate buffer solution having a pH-value of 4.0. The suspension is stored for 24 hours with shaking from time to time. The dissolved iron and aluminum are then quantitatively determined. The values based on 100 grams of crude clay are indicated in Table 2.

Hence, Table 1 shows the additional quantities of iron and aluminum which have been rendered water-soluble by the chemical aftertreatment. Table 2 indicates the residual amounts of iron and aluminum which are still contained in the bleaching clay and soluble in slightly acid liquids.

The following chemicals dissolved in 500 milliliters distilled $H_2O$ were used for the aftertreatment:

(1) Blank test without cehmicals
(2) 10 grams metaphosphoric acid
(3) 10 grams oxalic acid
(4) 10 grams citric acid
(5) 10 milliliters fluorosilicic acid
(6) 10 milliliters hydrochloric acid conc.
(7) 10 grams sodium metaphosphate
(8) 10 grams sodium oxalate
(9) 10 grams sodium citrate
(10) 10 grams sodium silicofluoride
(11) 20 milliliters sodium water-glass, d.=1.20

TABLE 1 OF EXAMPLE 3.—QUANTITIES OF Al AND Fe WHICH HAVE BEEN RENDERED WATER-SOLUBLE BY CHEMICAL TREATMENT, IN MILLIGRAMS PER 100 GRAMS OF CRUDE CLAY

| | Al | Fe |
|---|---|---|
| 1. Blank test without chemicals | 0 | 0 |
| 2. 10 grams metaphosphoric acid | 100.40 | 104.10 |
| 3. 10 grams oxalic acid | 97.3 | 104.10 |
| 4. 10 grams citric acid | 0 | 72.50 |
| 5. 10 milliliters fluorosilicic acid | 133.8 | 41.5 |
| 6. 10 milliliters hydrochloric acid | 58.2 | 73.70 |
| 7. 10 grams sodium metaphosphate | 88.6 | 84.9 |
| 8. 10 grams sodium oxalate | 80.5 | 124.5 |
| 9. 10 grams sodium citrate | 60.10 | 76.8 |
| 10. 10 grams sodium silicofluoride | 129.0 | 62.6 |
| 11. 20 milliliters sodium water-glass, d.=1.20 | 11.8 | 21.10 |

TABLE 2 OF EXAMPLE 3.—QUANTITIES OF Fe AND Al CONTAINED IN ACTIVATED BLEACHING CLAYS AND SOLUBLE IN SLIGHTLY ACID LIQUIDS (CITRIC ACID-PHOSPHATE BUFFER SOLUTION, pH—VALUE=4), IN MILLIGRAMS PER 100 GRAMS OF STARTING CRUDE CLAY

| | Al | Fe |
|---|---|---|
| 1. Blank test without chemicals | 54.0 | 103 |
| 2. 10 grams metaphosphoric acid | 10.8 | 26.8 |
| 3. 10 grams oxalic acid | 37.8 | 35.7 |
| 4. 10 grams citric acid | 70.2 | 44.7 |
| 5. 10 milliliters fluorosilicic acid | 54.0 | 122.8 |
| 6. 10 milliliters hydrochloric acid | 43.2 | 53.6 |
| 7. 10 grams sodium metaphosphate | 3.2 | 27.9 |
| 9. 10 grams sodium oxalate | 4.2 | 26.8 |
| 1. 10 grams sodium citrate | 18.4 | 32.4 |
| 80. 10 grams sodium silicofluoride | 16.2 | 66.0 |
| 11. 20 milliliters sodium water-glass, d.=1.20 | 23.7 | 65.9 |

EXAMPLE 4

Combination of two aftertreatments

Four mixtures of 200 grams dried and finely ground calcium bentonite in 1 liter water are prepared and preswelled over night. 200 milliliters of concentrated hydrochloric acid are added. The resulting mixture is boiled for six hours.

Mixture 1 (Comparison Test)

After the boiling treatment, the activating acid is removed on the suction filter and the filter cake is washed with 2 liters distilled water.

Mixture 2

Half an hour before the termination of the boiling in acid, 10 milliliters fluorosilicic acid are added. This is followed by suction-filtering and washing as with Mixture 1.

Mixture 3

After the boiling treatment, the activating acid is sucked off on the suction filter. The filter cake is then washed on the suction filter with a solution of 25 milliliters hydrochloric acid in 500 milliliters distilled water. A solution of 10 grams sodium metaphosphate in 500 milliliters distilled water is thereafter sucked through the filter cake, which is subsequently washed with 1000 milliliters of distilled water.

Mixture 4

Half an hour before the end of the activating treatment, 10 milliliters fluorosilicic acid are added. The clay is washed like Mixture 3 on the suction filter.

The filter cakes are dried and ground. One-half of the filter cake substance, corresponding to 100 grams of starting crude clay, is kept suspended for 24 hours in 500 milliliters citric acid-phosphate buffer solution having a pH-value of 4. The iron and aluminum transferred from the bleaching clay to the citric acid-phosphate buffer solution are determined. The following values were obtained in milligrams per 100 grams of starting clay:

|  | Al | Fe |
|---|---|---|
| Mixture 1S | 140.3 | 138.5 |
| Mixture 2 | 102.5 | 140.0 |
| Mixture 3 | 33.5 | 31.3 |
| Mixture 4 | 17.0 | 26.8 |

EXAMPLE 5

Three mixtures of 200 grams dried and finely ground calcium bentonite from the Moosburg deposits are pre-swelled in 1 liter of water over night. 200 milliliters concentrated hydrochloric acid are then added. Each mixture is boiled for six hours. The three mixtures are after-treated as follows:

Mixture 1

The acid-activated mixture is charged to a suction filter. The activating acid is sucked off. The filter cake is then washed with a mixture of 500 milliliters $H_2O$ dest. and 25 milliliters concentrated hydrochloric acid. It is then washed with a solution of 10 grams sodium metaphosphate in 500 milliliters distilled water and is finally washed with 1000 milliliters distilled $H_2O$ to remove all soluble matter.

Mixture 2

When the activating acid has been sucked from the suction filter, the filter cake is washed with a mixture of 500 milliliters distilled $H_2O$ and 25 milliliters hydrochloric acid. A solution of 25 milliliters sodium water-glass, d.=1.20, in 500 milliliters distilled $H_2O$ is then sucked through the filter cake. The latter is finally washed with 1000 milliliters distilled water.

Mixture 3

When the activating acid has been sucked off, the filter cake is washed with a mixture of 500 milliliters distilled $H_2O$ and 25 milliliters concentrated hydrochloric acid. A solution of 10 grams sodium metaphosphate in 500 milliliters distilled $H_2O$ is then sucked through the filter cake. The filter cake is then washed with a solution of 25 milliliters water-glass, d.=1,20, in 500 milliliters distilled $H_2O$. The filter cake is finally washed with 1000 milliliters distilled $H_2O$ to remove all soluble matter.

The three filter cakes are then dried at 150° C. and finely ground. 100 grams of the dried material are kept suspended in 1000 milliliters citric acid-phosphate buffer solution for 24 hours. The iron and aluminum transferred from the bleaching clay into the citric acid-phosphate buffer solution are determined. It is found that the following quantities of iron and aluminum in milligrams per 100 grams bleaching clay have been transferred into the buffer solution:

|  | Al | Fe |
|---|---|---|
| Mixture 1 | 61.5 | 49.2 |
| Mixture 2 | 71.2 | 42.5 |
| Mixture 3 | 15.1 | 35.7 |

EXAMPLE 6

Use of acid-activated bleaching clays according to the invention to stabilize beer In a small-scale test, acid-activated bleaching clay having received no phosphate treatment, acid-activated and phosphate-treated bleaching clay (both samples from Example 2) and, for comparison, finely ground silica gel are added to untreated beer from bottles. The added quantities correspond to 100 grams per hectoliter. The adsorbents are added in these quantities to the test beer, which is then thoroughly shaken and is stored at 0° C. for two days. The beer is then clarified by centrifuging and is transferred into colorless test bottles. For accelerated ageing, these test bottles are placed into a drying cabinet at 40° C. for three days and then into melting ice for one day. The chill-haze is measured with a measuring instrument and expressed in EBC units. The lower the measured turbidity, the better was the stabilizing effect of the adsorbent. This test was carried out with four different, untreated, pale strong beers from Munich breweries. The results are stated in the table.

TABLE

|  | Beer 1 | Beer 2 | Beer 3 | Beer 4 |
|---|---|---|---|---|
| Acid-activated bleaching clay having received no phosphate treatment, 100 g./hl | 11.8 | 6.6 | 11.5 | 12 |
| Acid-activated and phosphate-treated bleaching clay, 100 g./hl | 6.5 | 4.3 | 8.5 | 9.2 |
| Finely ground silica gel having large pores, 100 g./hl | 8.4 | 5.7 | 6.9 | 7.4 |
| Comparison beer without additives (approximate values) | 30 | 20 | 30 | 30 |

The foregoing example shows that in all beers the acid-activated bleaching clay which had been aftertreated with phosphate to greatly reduce the quantities of iron and aluminum which can be transferred from said clay to the beer had a much higher stabilizing activity than the acid-activated bleaching earth without phosphate treatment. With beers 1 and 2, the stabilizing effect was even better than that of the silicia gel used for comparison. With beers 3 and 4, the stabilizing effect was not quite as good as that of the silica gel. A calculation of the arithmetic mean of the measured turbidity values shows that the acid-activated bleaching clay which has been treated with phosphate has about the same effectiveness as the silica gel.

EXAMPLE 7

Comminution of the acid-activated bleaching clay prepared according to the invention before its use in treating beer A mixture is prepared which is similar to Mixture B of Example 2. The washed filter cake is divided into two parts.

(A) One half is dried at 200° C. over night and is then ground and screened. The fraction passing the screen having a mesh size of 0.063 millimeter is used for stabilizing beer.

(B) The other other half is also dried at 200° C. The resulting crumbs are subjected to wet comminution before being used in treating beer. To this end, 50 grams crumbs in 100 milliliters distilled water are comminuted for 10 minutes in a mixer. The resulting suspension is filled up with distilled water to 500 milliliters so that a 10% suspension is obtained.

The screened powder and the 10% suspension are used to treat three beers in accordance with Example 6. The adsorbent is used in an amount of 100 grams dry weight per hectoliter of beer. For a comparison, the beer is also treated with finely ground silica gel in an amount of 100 grams per hectoliter. A blank test without a treatment with adsorbent is also made.

RESULTS OF STABILIZATION TEST

|  | Beer 1 | Beer 2 | Beer 3 |
|---|---|---|---|
| Acid-activated bleaching clay as powder | 7.5 | 8.4 | 4.5 |
| Suspension of acid-activated bleaching clay, prepared by wet grinding | 6.2 | 6.4 | 3.0 |
| Finely ground silica gel | 8.8 | 7.0 | 3.6 |
| Blank test (approximate figures) | 30 | 30 | 20 |

The foregoing example shows also that the acid-activated bleaching clay prepared according to the invention has in a powdered state a stabilizing effectiveness which is approximately of the same order as that of the finely ground silica gel. In a suspension prepared by wet grinding, the same material has a much better stabilizing effectiveness.

In the foregoing test, the material intended for wet grinding was dried under relatively severe conditions so that hard particles had been formed. If the drying had been carried out under milder conditions, as stated in the specification, softer crumbs would have been formed which can be wet-ground more easily and more quickly.

What is claimed is:

1. Method of producing an adsorbent having a base of acid-activated montmorin minerals for the removal of protein substances from beverages, particularly wine and beer, and their preliminary stages, characterized by the fact that after acid digestion of the adbsorbent has been carried out and the digestion acid removed by washing the digestive mineral with dilute inorganic acid, the digestive material is thereupon treated with aqueous solutions of a compound or compounds selected from the group consisting of metaphosphoric acid, citric acid, oxalic acid, and fluorosilicic acid or their sodium salts and sodium silicate or mixtures thereof and washed out from same.

2. A process according to claim 1, characterized in that at least part of the residual iron and/or aluminum in the montmorin minerals is transformed into a form which is insoluble in weakly acid, aqueous liquids.

3. A process according to claim 1, characterized in that at least part of the residual iron and/or aluminum in the montmorin minerals is transformed into a water-soluble form and is washed out during the aftertreatment.

4. Method according to claim 1, characterized by the fact that before the treatment with said aqueous solutions, the digestion acid is washed out by washing the digestive mineral with water rather than dilute inorganic acid.

5. Method according to claim 1, characterized by the fact that the mineral which has been treated with said aqueous solutions is washed with water and squeezed out and dried at temperatures of up to 300° C.

6. Method according to claim 5, characterized by the fact that the expressed mineral which has been dried is formed into a paste with a small amount of water.

References Cited

UNITED STATES PATENTS

| | | | |
|---|---|---|---|
| 1,752,721 | 4/1950 | Bierce | 252—450 |
| 2,400,020 | 5/1946 | Pierce et al. | 252—450X |
| 2,495,751 | 1/1950 | Mills et al. | 252—450X |
| 2,579,576 | 12/1951 | Hickey | 252—450X |
| 2,903,434 | 9/1959 | Gloss et al. | 252—450X |
| 2,981,697 | 4/1961 | Mickelson et al. | 252—450 |

PATRICK P. GARVIN, Primary Examiner

C. F. DEES, Assistant Examiner

U.S. Cl. X.R.

99—48